United States Patent [19]

You

[11] Patent Number: 5,148,686
[45] Date of Patent: Sep. 22, 1992

[54] DEFROST CONTROL APPARATUS FOR A REFRIGERATION SYSTEM

[75] Inventor: Han J. You, Kwangmyung, Rep. of Korea

[73] Assignee: Samsung Electronics Co., Ltd., Rep. of Korea

[21] Appl. No.: 747,346

[22] Filed: Aug. 20, 1991

[30] Foreign Application Priority Data

Aug. 16, 1990 [KR] Rep. of Korea .................. 90-12618

[51] Int. Cl.[5] ............................................. F25D 21/00
[52] U.S. Cl. ........................................ 62/234; 62/158; 62/140
[58] Field of Search ................. 62/139, 140, 151, 155, 62/158, 234, 157

[56] References Cited

U.S. PATENT DOCUMENTS 4,251,999 2/1981 Tanaka ................................. 62/155
4,299,095 11/1981 Cassarino ............................ 62/158

FOREIGN PATENT DOCUMENTS 58-55670 4/1983 Japan .

Primary Examiner—Albert J. Makay
Assistant Examiner—J. Sollecito
Attorney, Agent, or Firm—Burns, Doane, Swecker & Mathis

[57] ABSTRACT

This defrost control apparatus counts power failure time by using a back-up battery during power failure. In an instantaneous power failure, timers are not reset and operate normally to execute defrost at normal defrost cycle by using power of the back-up battery. During a long power failure, only when it continues over a predetermined time, the timers receives a reset signal and are initialized whereby the defrost operation is executed at a normal interval of the defrost cycle and, because frost melts by the action of natural defrost, the timers are initialized and count the time initiating a defrost cycle from the beginning.

6 Claims, 4 Drawing Sheets

DEFROST CONTROL APPARATUS FOR A REFRIGERATION SYSTEM

BACKGROUND OF THE INVENTION

The present invention relates to a defrost control apparatus for a refrigeration system, and particularly, when the power supply is cut off during the operation of the refrigeration system, to a defrost control apparatus for controlling a time term to initiate defrost cycles according to the power throwing-in after breaking down power for a long or a short period.

A conventional refrigerator generates much frost on the evaporator because of the fluctuation of the inside temperature falling off on an evaporator. The frost on the evaporator is removed by driving a defrost heater in order to melt it at intervals of predetermined time. At this time, a defrost timer is installed in the refrigerator to control the interval of the defrost cycle.

A typical example of a defrost apparatus as described above is disclosed in U.S. Pat. No. 4,299,095. This patent initiates a defrost cycle upon the occurrence of two sensed conditions by detecting pressure passing through the evaporator and temperature in the evaporator. The defrosting time is determined by the defrost timer.

A conventional defrost apparatus is shown in FIG. 1. It is described as follows referring to FIG. 1. In the case that the timer apparatus is a mechanical timer, when the power supply is cut off during the operation of a refrigerator, the defrost apparatus does not detect the power failure and, furthermore, when the power supply is cut off for a long time, because the refrigerator is in the state of natural defrost during the power failure, even though the frost on the evaporator has been melted during the power failure, the mechanical timers 2 and 3 are still driving. Thereafter, when the power is applied to the refrigerator in restoration of the power, the refrigerator initiates a defrost cycle at the time set irrespective of the power failure by the timer. In spite of no frost on the evaporator, the defrost heater is wastefully driven, so the inside temperature of the refrigerator rises and, furthermore, the refrigerator has the disadvantage that it wastes power due to a wasteful operation of defrost.

In the case that the defrost timer apparatus is an electrical apparatus, the timers 2 and 3 receive reset signals in a short term as well as in a long term of power failure, so they are initialized. When power is again applied to the refrigerator after restoration of power, the compressor driving portion 4 is driven and the timers 2 and 3 start counting a predetermined time (for example, normally 6 hours). After the predetermined time lapes, the refrigerator operates in the defrost mode. When the power supply is cut off before the defrost time, a defrost timer starts again from the beginning.

Accordingly, the conventional refrigerator has the disadvantage that it misses the time initiating a defrost cycle, so frost forms on the evaporator and the cooling operation is not effectively achieved.

An example to obviate the problems is disclosed in Japanese Patent Publication No. Sho 58-55670. In this patent, cooling operation rate is calculated from the time to terminate a prior defrost cycle. An interval of the defrost cycle adapted to the cooling operation is obtained by multiplying an interval of the defrost cycle in the continuous cooling operation to a predetermined parameter. At power failure, a defrost cycle is forcibly initiated after the lapse of a predetermined time from restoration of power. However, because this patent determines the time to initiate defrost cycle without distinguishing an instantaneous and a long power failure.

SUMMARY OF THE INVENTION

In order to solve these problems, the present invention is devised. It is an object of the invention to provide a defrost control apparatus which adjusts the time to initiate a defrost cycle according to the length of power failure upon restoration of power.

To accomplish the objective, in addition to a defrost apparatus including a compressor, pause timer, compressor driving portion, defrost heater driving portion and bimetal portion, the defrost control apparatus comprises a power failure control portion for controlling each portion of this apparatus and detecting power failure, a back-up battery portion for supplying and cutting off power to this apparatus according to the existence and/or nonexistence a of power failure detection signal output from the power failure control portion, power failure timer for resetting, by applying to a reset signal to a compressor driving timer and pause timer when a predetermined time lapse from the moment which the power failure detection signal is applied to it from the power failure control portion.

This defrost control apparatus counts power failure time by using a back-up battery during a power failure. During an instantaneous power failure, the timers are not reset and operate normally to execute defrost at normal defrost cycle by using power of the back-up battery. In a long power failure, only when it continues over a predetermined time, the timers receive an initial reset signal and whereby the defrost operation is executed at a normal interval of defrost cycle and, because frost melts by the process of natural defrost, the timers are initialized and count the time initiating a defrost cycle from the beginning.

DETAILED DESCRIPTION OF THE INVENTION

A preferred embodiment of the invention will now be described in conjunction with the accompanying drawings.

Figure 1:
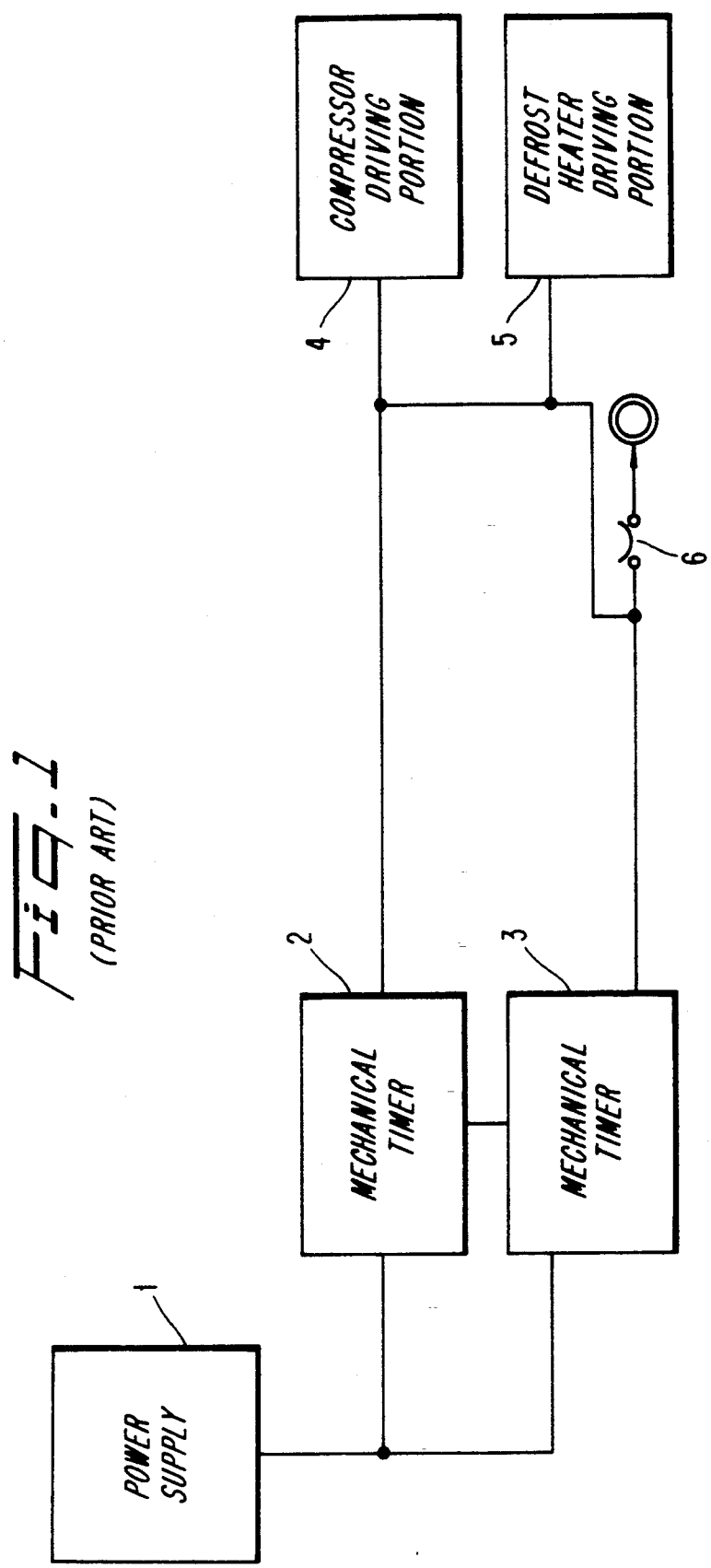
FIG. 1 is a block diagram showing a prior art defrost control apparatus for a refrigeration system.
Figure 2:
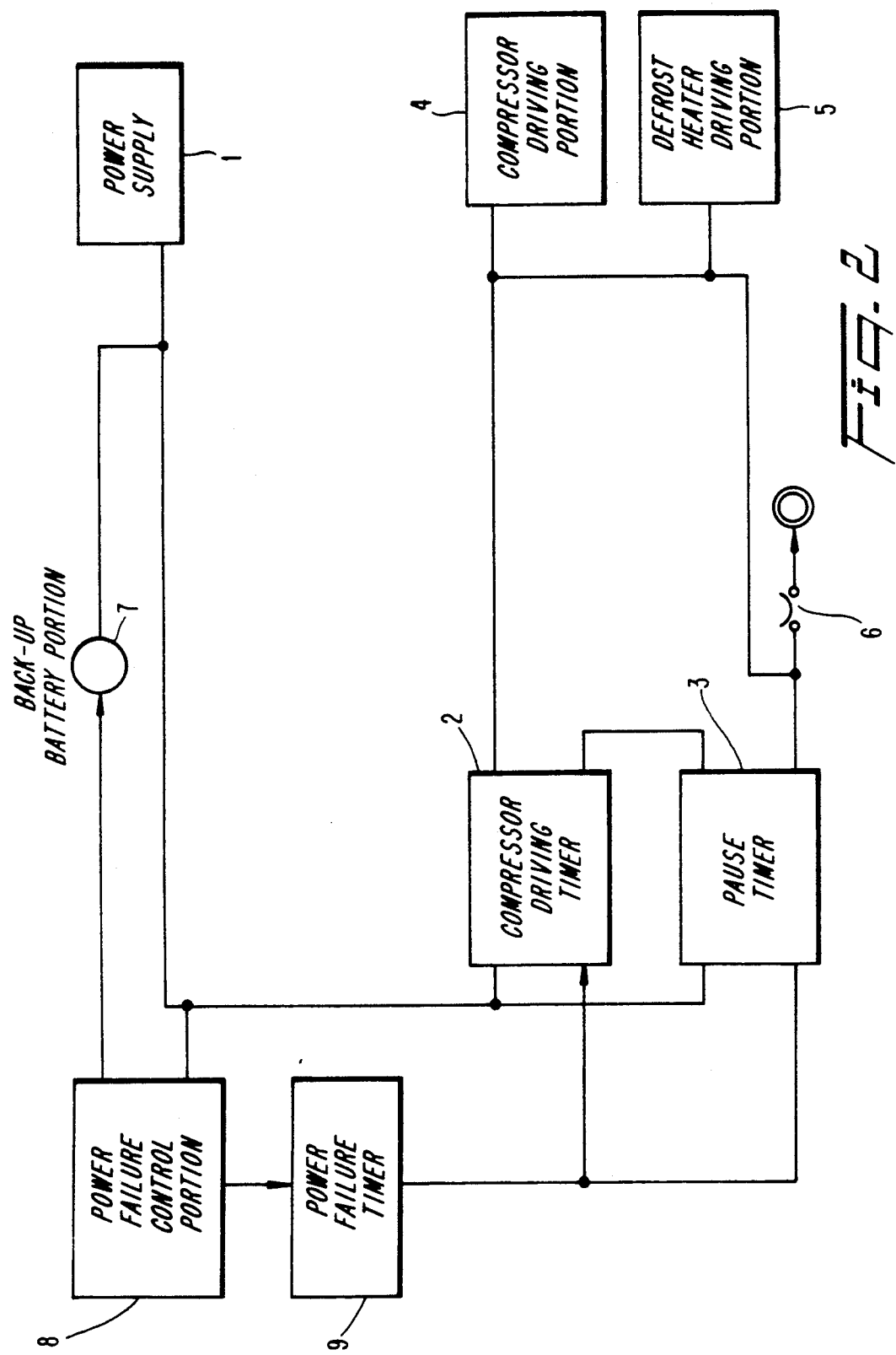
FIG. 2 is a block diagram showing the defrost control apparatus for a refrigeration system according to the present invention.

Referring to FIG. 2, the conventional system is included, which is provided with power supply 1, compressor driving timer 2, pause timer 3, compressor driving portion 4, defrost heater driving portion 5 and bimetal 6. In addition to the prior defrost control apparatus, the defrost control apparatus comprises a power failure control portion for controlling each portion of this apparatus and detecting a power failure state, a back-up battery portion for supplying and cutting off power to this apparatus according to the existence and/or nonexistence of a power failure detection signal output from the power failure control portion, a power failure timer for resetting by applying a reset signal to the compressor driving timer and pause timer when a predetermined time lapse from the moment when the power failure detection signal is applied to it from the power failure control portion.

The detailed description of the present invention including the elements described above is as follows:

At the beginning when the normal power is applied to a refrigerator, power supply portion 1 generates power adapted to the apparatus and charges back-up battery portion 7, simultaneously applying power to compressor driving timer 2 and pause timer 3, compressor driving portion 4 thereby driving the compressor and lowering inside temperature of refrigerator by the action of compressed refrigerant.

The compressor driving timer 2 counts the driving time during the operation of the compressor and applies a control signal to the pause timer 3, so it does not operate.

When the compressor driving timer 2 counts a predetermined time, it sends a driving stop signal to compressor driving portion 4 and driving signal to defrost heater driving portion 5, so the compressor pauses and the defrost heater operates. Hereafter, the defrost heater is driven by power applied to it through the bimetal portion 6 and generates heat, so it melts frost on the evaporator. At this time, bimetal portion 6 is expanded by the heat and, if a predetermined time expires, cuts off the power applied to the defrost heater.

The pause timer 3 does not operate until the defrost heater finishes the heating operation and, if it finishes the heating operation, starts operating. It counts the predetermined pause time, so it drives the compressor after the predetermined pause time whereby the refrigerant under high pressure is changed to that under low pressure and low temperature and the overload in the compressor is prevented by driving the compressor thereafter.

When the defrost heater driving portion 5 turns off the defrost heater, the pause timer 3 counts subsequently the predetermined pause time, the pause timer 3 applies a control signal to compressor driving timer 2 in order to initialize it and returns itself to the beginning state.

During an iterative drive of the refrigerator as described above, a short or long power failure comes about, so power source portion 1 interrupts the power supply to the refrigerator.

Thus, at the moment of the power failure, power failure control portion 8 detects the state of the power source portion and applies the power of the back-up battery to the power failure timer 9, the compressor driving timer 2 and the pause timer, so they are driven.

At this time, whether the state of the power failure is for an instantaneous time or a long time is determined in reference to the set time in the power failure timer 9. Wherein, it is a preferred embodiment, the set time is the time natural defrost has been finished.

Accordingly, after the power failure, if restoration of power happens before the set time (for example: 100 minutes), the power failure timer 9 is reset, so it is suspended till the power supply is again cut off. As described above, if being powered before the set time, the power failure control portion 8 regards the state as an instantaneous power failure, so it drives the defrost control appratus according to the process such as the normal state.

On the other hand, if power is applied to this apparatus from the power source portion 1 over the set time (for example: 100 minutes), power failure control portion 8 regards the state as the long power failure, so it drives the defrost control apparatus according to the process adapted to the long power failure.

The power failure timer 9 is triggered by receiving the signal from the power failure control portion 8, it counts the time of the power failure. If the power failure is continued over the set time, because natural defrost is accomplished, the power failure timer 9 sends a signal to the reset terminals of the compressor driving timer 2 and the pause timer 3 till restoration of power. Thus, the compressor driving timer 2 and the pause timer 3 is reset and initialized, so the defrost timer apparatus is not driven till restoration of power.

Successively, if power is regained, the power failure control portion 8 cuts off the back-up battery portion 7, turns off the power failure timer 9 and releases the compressor driving timer and the pause timer from the reset state, so they are driven in the process prior to power failure.

Figure 3A:
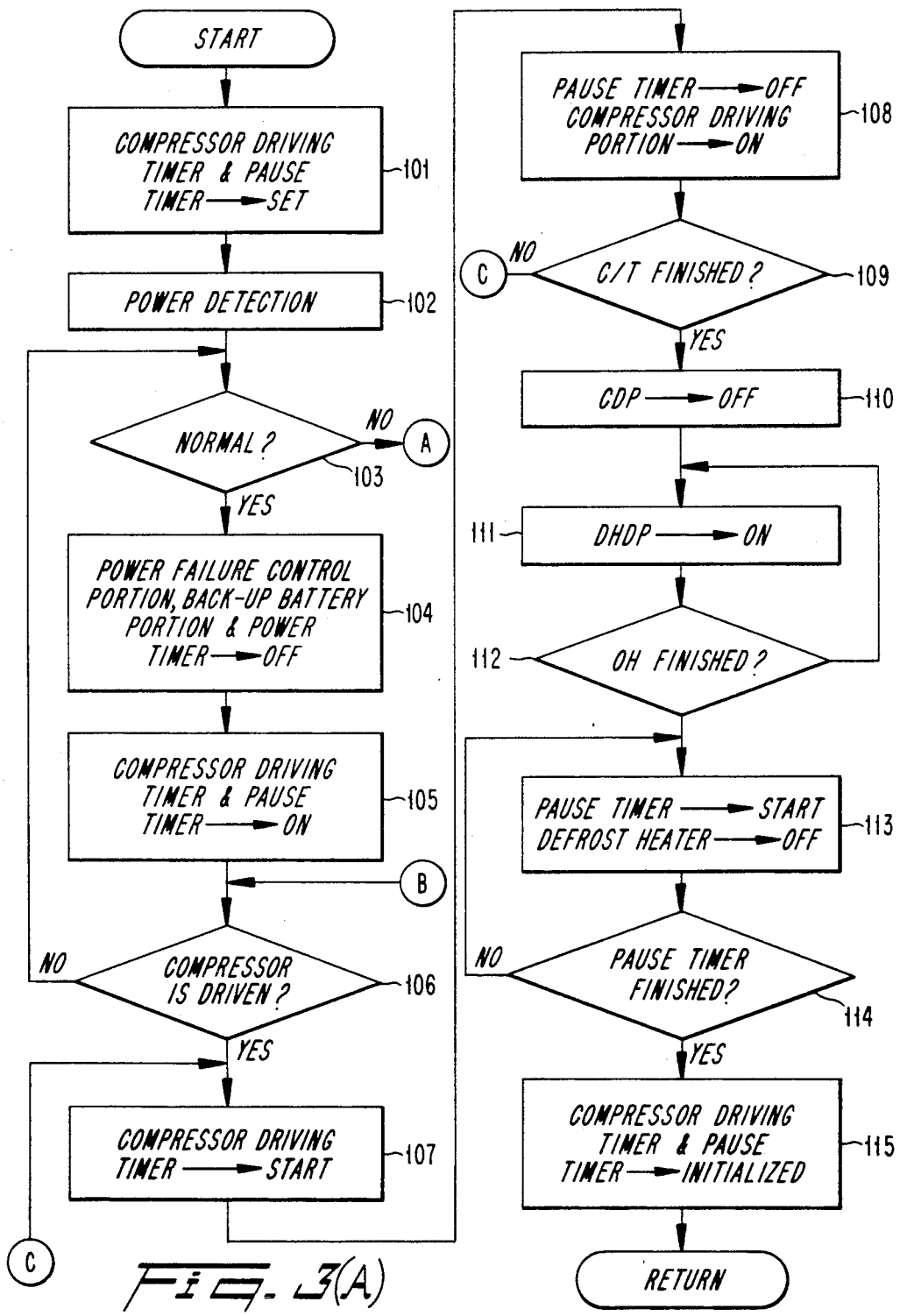
FIGS. 3A and 3B are flow charts describing the driving process of the present invention.
Figure 3B:
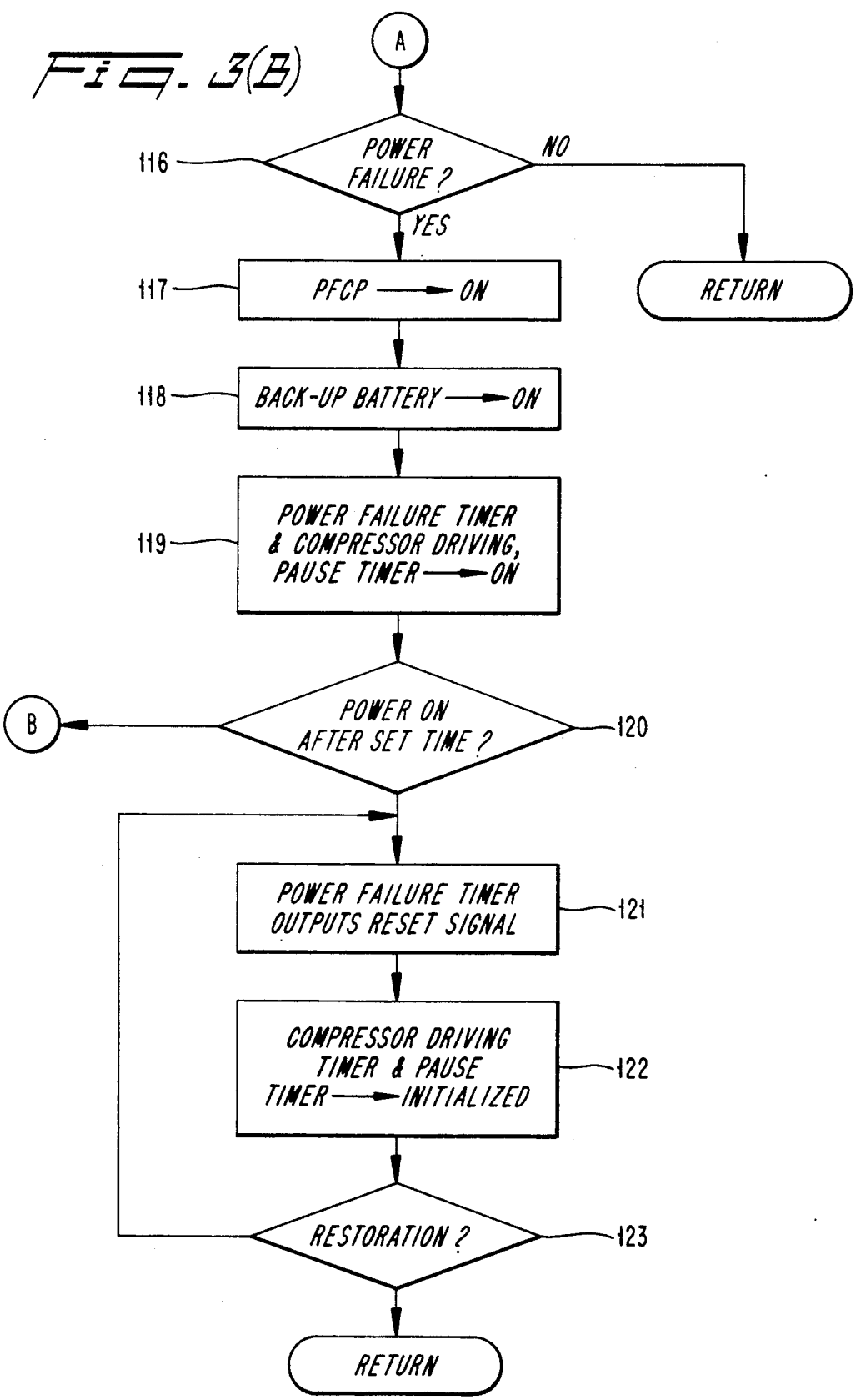

In another embodiment, the power failure control portion 8 comprises a microprocessor and controls the apparatus according to the present invention with the method such as the flow chart shown in FIGS. 3(A) and 3(B).

Referring to FIGS. 3(A) and 3(B), this method is described as follows:

When power is applied to the apparatus according to the present invention, times are set at the compressor driving timer 2 and the pause timer are set to the predetermined times (step 101). Each portion (power line connected to the compressor driving portion 4 and the defrost heater driving portion 5 is not shown) of refrigerator is powered, so that refrigerator operates (step 102). The voltage supplied from the power source portion 1 to the apparatus is checked, so it is determined at step 103 whether or not the power source is normal. If the power source is not normal, it is determined whether or not the power supply is cut off(step 116). If the power supply is not cut off, this process returns to the main program. If the power supply is cut off, the power failure detection buffer(BF) is set(step 117), so the back-up battery portion 7 is driven (step 118) and the compressor driving timer 2 and the pause timer 3 continue to count the timer by power supply to the defrost control apparatus according to the present invention. On the other hand, from the moment a power failure is detected, the power failure control portion 8 makes the power failure timer 9 count power failure time by applying power to it(step 119). At step 120, because the power failure timer 9 is set to the predetermined time (for example, 100 minutes : it is preferred that the time be a little longer than the natural defrost time), if restoration of power happens before the predetermined time, the power supply to the power failure timer 9 is cut off, so the compressor driving timer 2 and the pause timer 3 counts the defrost time in the state such as the normal state whereby the defrost heater driving portion 5 is driven and defrost operation is executed in the normal defrost cycle. If the power failure timer 9 counts the predetermined time during the power failure, the compressor driving timer 2 and the pause timer 3 are reset by the reset signal from the power failure timer 9. It is determined at step 123 whether restoration of power happens with the compressor driving timer 2 and the pause timer being reset. If restoration of power happens, step 121 is iteratively executed and, if the power supply is continuously cut off, the process returns to the main program.

At step 103, when the microprocessor determines that the power supply is normal, it turns off the back-up battery portion 7 an the power failure timer (step 104), and turns on the compressor driving timer 2 and the pause timer 3 (step 105). Subsequently, it is determined whether the compressor operates (step 106). If it does not operate, the step 103 is repeatedly executed. If it operates, the compressor driving timer 2 is triggered, so it counts the compressor driving time (step 107), and the pause timer 3 is interrupted whereby the compressor driving portion turns on and the refrigerator operates.

At step 109, it is determined whether the compressor driving timer 2 finishes counting the predetermined time. If it does not, step 107 is iteratively executed, and if it does, the compressor driving portion 4 turns to the "off" state (step 110) and the defrost heater driving portion 5 turns to the "on" state (step 111).

When the defrost heater generates heat, the bimetal portion 6 receives the heat. It is extended by the heat after the predetermined time, so it cuts off power applied to the defrost heater.

Wherein, it is determined that the defrost heater generates heat during a predetermined time (step 112). If the predetermined time does not elapse from the heating start time, the step 111 is repeatedly executed. If the predetermined time expires from the heating start time, the pause timer 3 is triggered and starts counting the time (step 113).

The reason that the compressor is driven after counting when predetermined time of the pause timer expires is to prevent the overload from being applied to the compressor by changing the refrigerant having high temperature and pressure with the defrost heat to low temperature and pressure.

It is determined that the pause timer 3 counts the predetermined time, so if it does not elapse, the step 113 is repeatedly executed and, if it elapses, the compressor driving timer 2 and the pause timer 3 are initialized and the process returns to the main program.

As described above, the present invention operates in the mode that it detects power failure time occurring during the operation of refrigerator, and, if the detected power failure time is within the natural defrost time, it regards the state as an instantaneous power failure, so, it makes the refrigerator operate in the normal state by the power supply back-up battery, and if the power failure is continued over the natural defrost time, because the natural defrost is accomplished, the defrost timer is reset and held in the beginning state, at the moment of restoration of power, the refrigerator operates in the state prior to the power failure whereby the inside temperature of refrigerator does not wastefully rise so as to economize power and the problem caused by the rise of the inside temperature is solved.

What is claimed is:

1. A defrost control apparatus for a refrigeration system including a power source, compressor driving timer, pause timer, compressor driving portion, defrost heater driving portion and bimetal portion, comprising:
    power failure control means for controlling each portion of the refrigeration systems and detecting a power failure while connected to the power source;
    a back-up battery means for supplying and cutting off a power supply according to the existence and nonexistence of a power failure detection signal from the power failure control means:
    a power failure timer means for outputting a signal initializing the compressor driving timer and the pause timer when a predetermined time elapses from when a power failure detection signal is received from the power failure control means.

2. A defrost control apparatus for the refrigeration system of claim 1, wherein;
    the predetermined time is the natural defrost time of the refrigeration system during a power failure.

3. A defrost control apparatus according to claim 1 wherein said power supply control means supplies power to the defrost control device when said power failure detection signal is generated and supplies zero power to the defrost control device when no power failure signal is generated.

4. A defrost control device according to claim 1 wherein said resetting means resets the defrost control device if said power failure detection signal is generated during the entire predetermined time period.

5. A defrost control device according to claim 1 wherein said predetermined time period corresponds to a period greater than or equal to a period of natural defrost.

6. A defrost control apparatus for a refrigeration system comprising:
    power failure control means for detecting a power failure in a defrost control device, said power failure control means generating a power failure detection signal when a power failure is detected;
    means for controlling power supplied to the defrost control device based on whether said power failure detection signal is generated; and
    means responsive to said power failure control means for resetting the defrost control device after a predetermined time period following the generation of said power failure detection signal.

* * * * *